United States Patent [19]

Koechner

[11] Patent Number: 4,931,646
[45] Date of Patent: Jun. 5, 1990

[54] REMOTE MULTICHANNEL COINCIDENT NUCLEAR DETECTOR AND CHARACTERIZATION SYSTEM

[75] Inventors: Walter Koechner, Round Hill; Deborah R. Van Wyck, Lake Ridge; Garry B. Spector, Alexandria; Tom McCollum, Sterling, all of Va.

[73] Assignee: The United States of America as Represented by the Secretary of the Army, Washington, D.C.

[21] Appl. No.: 336,455

[22] Filed: Mar. 17, 1989

[51] Int. Cl.⁵ .................. G01T 1/20; G01T 1/208
[52] U.S. Cl. .................... 250/367; 250/366; 250/368; 250/369; 340/522; 340/600
[58] Field of Search ............... 250/367, 368, 369, 366; 340/600, 522

[56] References Cited

U.S. PATENT DOCUMENTS 3,008,045  11/1961  Ruderman ........................ 250/366
3,363,100   1/1968  Cohen et al. ..................... 250/367
4,598,202   7/1986  Koechner ......................... 250/366

*Primary Examiner*—Constantine Hannaher
*Attorney, Agent, or Firm*—Milton W. Lee; Max L. Harwell; Anthony T. Lane

[57] ABSTRACT

A multichannel coincidence nuclear detector system for spectral characterization of nuclear radiation sources at a remote location. The system is designed to detect and classify the radiation source in unfriendly territory and to provide a radio link back to a friendly receiver user station. The sensing elements are comprised of a plurality of plastic scintillator fiber sensors which may be several meters long and with each fiber having a different spectral sensitivity to gamma and neutron sources. Each of the scintillator fibers is connected to a transmitting optical fiber which may be 1 kilometer or more in length. The plurality of optical fibers transmit the optical signal generated by the radiation from a nuclear source impinging on the scintillator fibers to an electronic system. The electronic system is a sealed self contained battery operated device which is comprised of a photomuliplier detector and microprocessor based signal processing and data storage. The microprocessor compares the input signals from each scintillator fiber and determines the energy source. The data is stored in the microprocessor and may be interrogated by a radio frequency link to at a receiver station many kilometers away. The fiber sensors, optical fibers, and the electronics system including a transmitting antenna are all covertly positioned to prevent being observed by an unauthorized person.

5 Claims, 4 Drawing Sheets

REMOTE MULTICHANNEL COINCIDENT NUCLEAR DETECTOR AND CHARACTERIZATION SYSTEM

The invention described herein may be manufactured, used, and licensed by the U.S. Government for governmental purposes without the payment of any royalties thereon.

BACKGROUND OF INVENTION

1. Field of the Invention

The present invention relates to a system of spectral characterization and classification of nuclear radiation sources at a remote location wherein the sensing elements are comprised of plastic scintillator fibers. Each fiber has a different spectral sensitivity with regard to gamma and neutron sources in which outputs from the different fibers are compared to determine the energy spectrum of a nuclear source being monitored.

2. Prior Art

There are two techniques most often used for performing spectral measurements. These are pulse height spectroscopy and pulse shape discrimination. The basis for pulse height spectroscopy is the recording and analysis of the amplitude distribution of pulses produced by a radiation detector. The position of the peaks of the recorded pulse height spectrum provide the relative energy of the particles impinging on the detector. Pulse height spectroscopy is most appropriate in a point detector. Pulse shape discrimination is an important tool in nuclear discrimination measurements since the shape of the pulse can provide considerable information on the particles incident on the detector. The energy transfer process in organic scintillator is the basis for pulse shape discrimination.

Each of the two techniques is well suited to a laboratory environment but neither are very conducive for use in a remotely deployed nuclear radiation sensor system as in the present system.

SUMMARY OF THE INVENTION

The present remote nuclear radiation detector and signal processing and data storage system provides a sealed, battery operated self-contained unit for field use which does not require laboratory equipment for operation. Unlike the geometric constraints of a point detector which can only have one point close to the nuclear source, the present detector is a plurality of line detectors, known as a multichannel coincidence nuclear detector (MCD) which can measure nuclear radiation over a large area or across a perimeter. The line detectors, which may be several meters long and in a pattern from linear to circular, are comprised of a plurality of plastic scintillator fibers which may be several meters long in which each fiber is made of a different scintillator core material to carry out particle and energy discrimination and an outer polymer cladding material of smaller index of refraction. Each fiber has a different spectral sensitivity with regard to gamma and neutron sources. The scintillator core materials emit photons upon absorption of nuclear radiation. The optical radiation generated by each scintillator fiber is transmitted by an optical fiber, which may be 1 kilometer or longer, to a photomultiplier tube. The photomultiplier tube measures the pulse count above threshold in each of the optical fibers.

The system provides for remote and convert detection and classification of nuclear radiation sources in a tactical environment. The separate radiation sensitive line detectors are based on the measurement and comparison of the different responses received. One of the coinventors, Walter Koechner has received a U.S. Pat. No. 4,598,202, entitled "Nuclear and Pressure Sensitive Line/Perimeter Detection System", which teaches use of similar scintillator fiber sensors in a detector system requiring simultaneous pressure and radiation energy stimulis to generate an event. The coincidence detection of a nuclear radioisotopic source simultaneously by all of the several scintillators provide a means for detecting and identifying the specific source. The specific sources which are being monitored may be confined to a very few radiation sources. The multichannel coincidence nuclear detector serves at least the following purposes. It identifies the presence of ionizing radiation and classifies the level of radiation compared to the ambient background. The detector determines whether the signal is composed of gamma rays, or fast neutrons or both. The gamma rays are further classified as belonging to these three energy bins: 0–0.1 MeV; 0.1 MeV–0.5 MeV; and 0.5 MeV–1.0 Mev or higher.

A signal processing system, comprised of a microprocessor and an on-board computer compares the outputs from the different fibers and determines the energy spectrum of the source. The information is stored in the computer and may be transmitted through a radio frequency link by remote interrogation of a receiver user station.

DETAILED DESCRIPTION OF THE PREFERRED EMBODIMENTS

Figure 1:
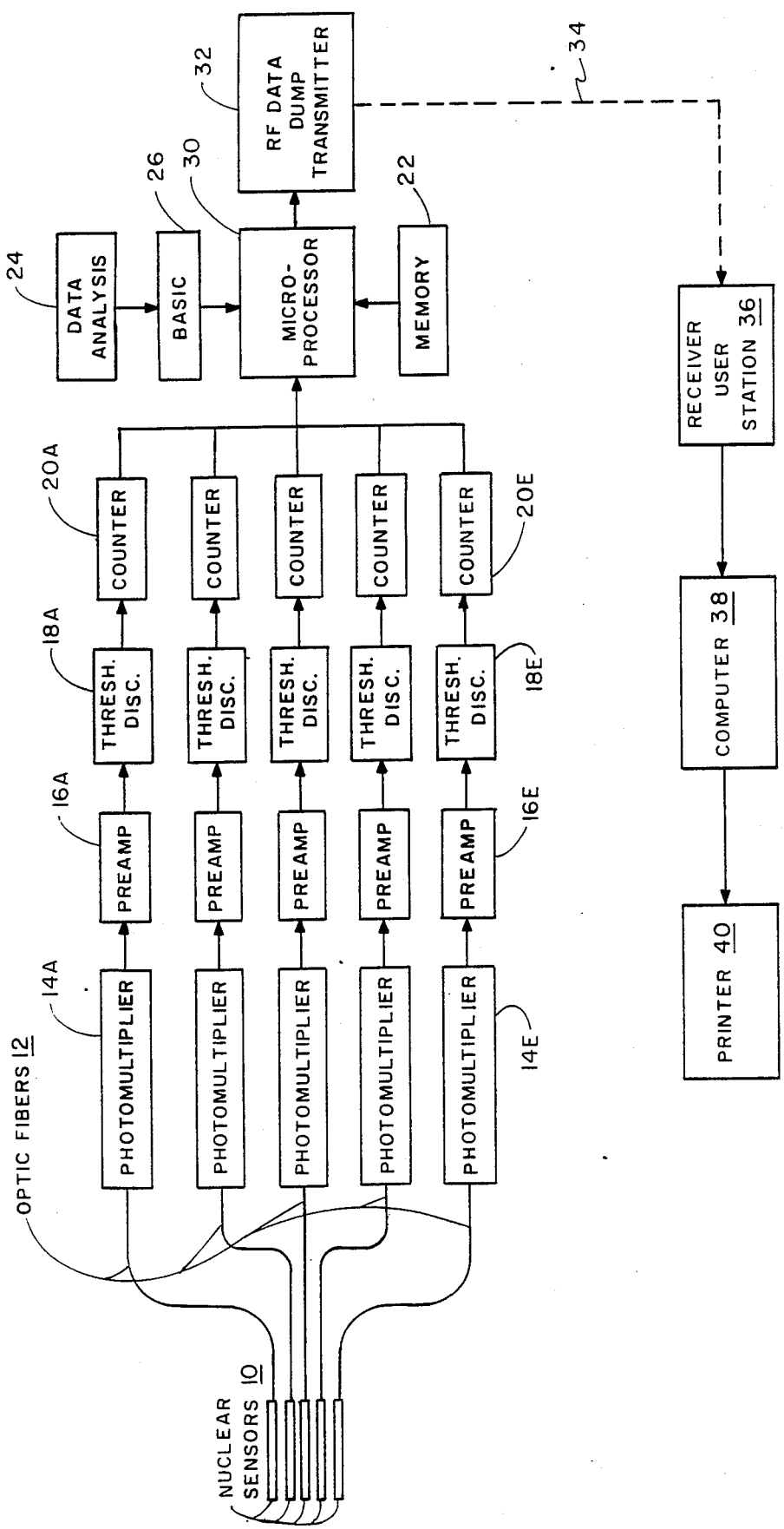
FIG. 1 illustrated in block diagram form the present nuclear detection and source classification system.

Refer to FIG. 1 for a review of each portion of the system of covert and remote detecting and characterizing of weapons grade nuclear sources in a tactical environment. The system is presented as a five multichannel coincidence nuclear detector system but is not limited to that number. Each of the multichannels form an individual radiation channel through the system from the individual fiber sensors to a microprocessor based signal processing system and data dump for transmittal to a remote receiver user station.

The nuclear sensing element is comprised of a plurality of scintillator fiber sensors 10 with each fiber sensor having a different spectral sensitivity with regard to gamma and neutron sources. These fiber sensors 10 are each fabricated from a different scintillator inner core material to carry out particle and energy discrimination wherein a determination is made as to whether an incident particle flux on the fiber sensors is comprised of gamma rays or fast neutrons and the relative energy of any gamma rays. The inner cores are embedded in a nuclear radiation transparent polymer cladding outer material of smaller index of refraction than the inner core material. The spectrum of gamma radiation and the presence or absence of neutron flux can be determined by comparing the sensitivity and energy of the output signals from each fiber sensor and the source can be identified from its known signature.

The optical radiation generated by each scintillator fiber sensor is transmitted by one of a plurality of optical fibers 12. Sensors 10 and optical fibers 12 are preferably connected together by a sleeve that is epoxy glued over the ends of 10 and 12. Optical fibers 12 are connected to the input of an optical detector and amplifier means, which may be a plurality of photomultipliers 14A–14E and a plurality of preamplifiers 16A–16E, of an electronics system. The length of the fibers 12 and sufficiently long enough to have the sealed electronics system hidden in a location remote from the fiber sensors. The connections of each fiber sensor to each optical fiber forms the beginning of a plurality of radiation channels that continue through the system. The electronics system is a self contained sealed battery operated unit having electrical detector and amplifier means comprised of photomultipliers 14A–14E for converting the input optical signals into output electrical pulses which are amplified by a plurality of preamplifiers 16A–16E by a factor of 100 to 1000 wherein low frequency fluctuations are cut off by the preamplifiers. The amplifier pulses 18A–18E are thresholded by a plurality of threshold discriminators 18A–18E at a low, or trigger signal level, and at a high, or event signal level. For each pulse that exceeds the threshold values, the discriminator emits an output pulse. These plurality of output pulses are accumulated over a set period of time are counted by a plurality of counters 20A–20E. The information contained in the counters 20A–20E are used in a microprocessor based signal processing system which compares the output signals in the radiation channels from the fiber sensors and determines the energy spectrum of the radiation source as to whether the source is weapons grade nuclear material.

The microprocessor 30, which may be from the Motorola 6800 family or from the ITEL 8000 family of microprocessors, has memory 22 and data analysis means 24 along with basic software support and real time clock data 26 built therein. Samplings of the counts are preferably at 0.25 second intervals whereupon the threshold for possible events is calculated. An average may be taken and compared to the low threshold. The low threshold is defined as the threshold above which the microprocessor begins temporary storage of pulses for analysis as a possible event. Analysis of the count rates from each channel is performed using a software algorithm loaded into the microprocessor. This algorithm continually adjusts to changing background levels, and recognizes events when the count rate exceeds a threshold. When an event occurs, a comparative analysis of all channels is performed to obtain spectral information based on the normalized differences between signals from different channels. The date, time, and the data for each event are stored in microprocessor memory for later retrieval.

The event data that is stored in the microprocessor may be transmitted at a selective time by interrogation by a receiver user station using a radio frequency link 34 between the receiver user station 36 and the microprocessor data dump 32 at the multi-channel detector transmitter station. Both receiver station 36 and the transmitter station have separate units comprised of a radio transceiver and a modem along with built in battery and interface circuitry. The transmitter station unit may be connected to the microprocessor 30 by weatherized cable which may be several meters long and has antenna interface circuitry connections thereto which is compatible with a radio frequency transmitting antenna of any type. The receiver station 36 is comprised of a memory in which the same type interface circuitry is located between memory in the user station and a receiver antenna. The user station may use a personal computer 38 and a printer 40 to view and record the event data and time of occurrences.

The radio frequency link between the multichannel detector microprocessor and the user station can be accomplished by different means. Consideration should be given as to the particular type convert operation in choosing which antennas may be used and how they are hidden. The link may be by microwave. However, concealing the transmitting microwave antenna could be a problem. Whip antennas may be used and could be more easily hidden. A preferred embodiment is by the use of a covert satellite radio link. The land based multichannel detector station may be linked to the land based receiver user station by reflecting the signals off a satellite. The satellite may be geosynchronous or orbiting through an area of the sky periodically. The transmitting dish antenna could be buried in the ground along with the self contained sealed electronics system, with each just below the ground surface. The antenna could be pointed toward the satellite with the face of the dish covered with a dielectric shield to support a thin layer of soil. The power requirement would be between 10–1000 watts depending on the orbital position of the satellite. Aligning the user station to the satellite would not be difficult since the radiation pattern from the satellite spreads out uniformly over thousands of miles in friendly territory.

Figure 2:
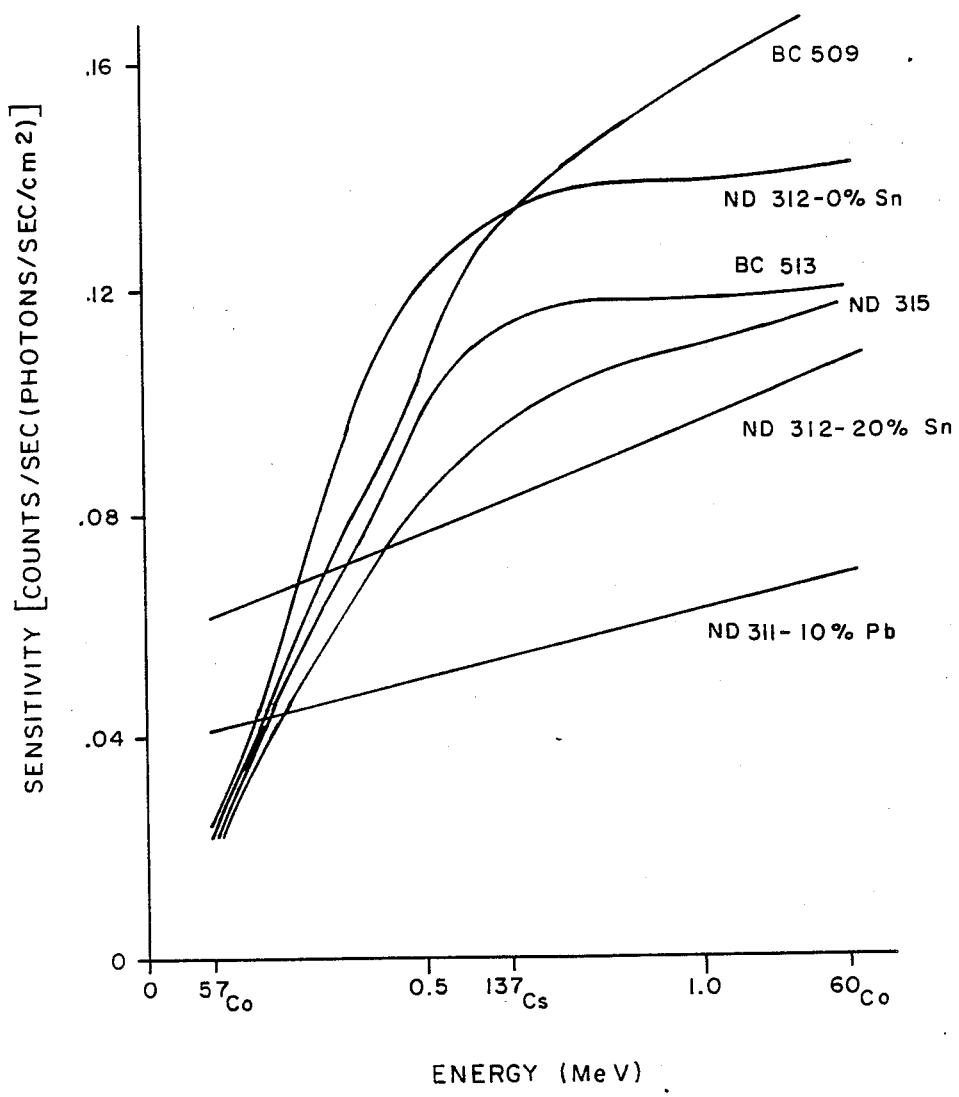
FIG. 2 shows the responses of different individual scintillators to radiation sources that emit gamma rays.
Figure 3:
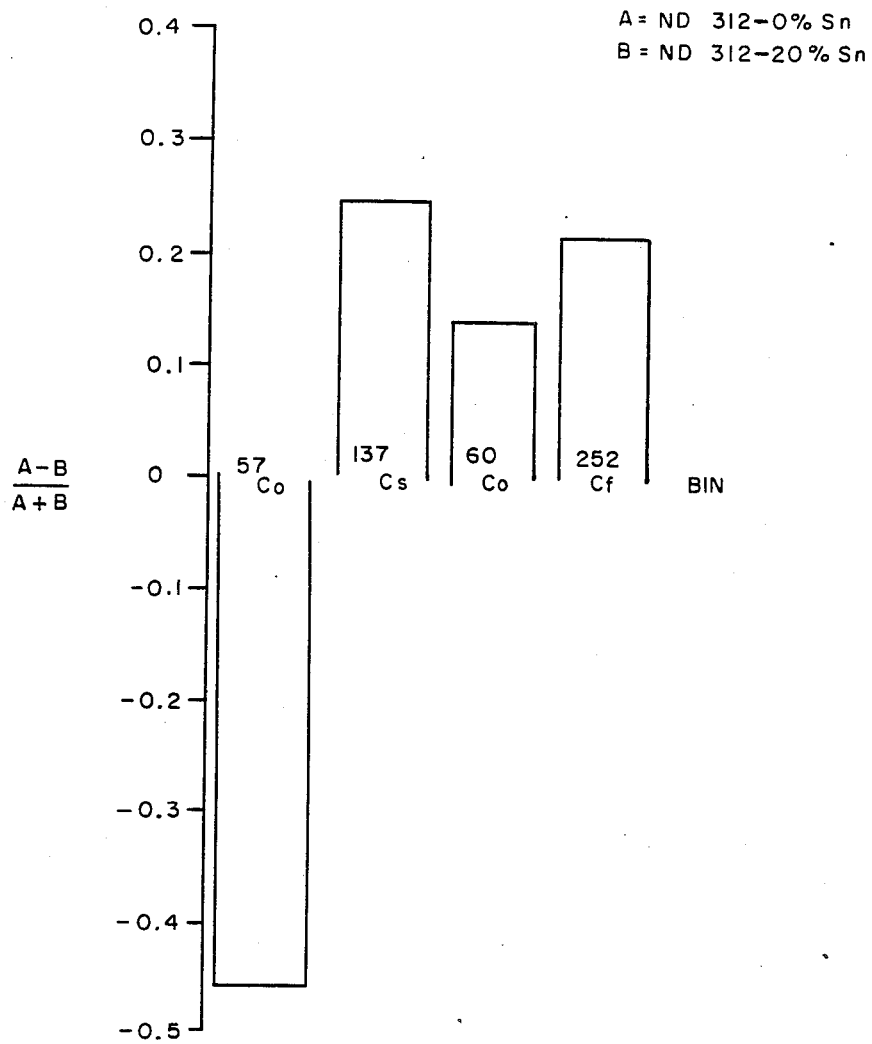
FIG. 3 shows the results of differential measurements between two scintillators with four radiation inputs.
Figure 4:
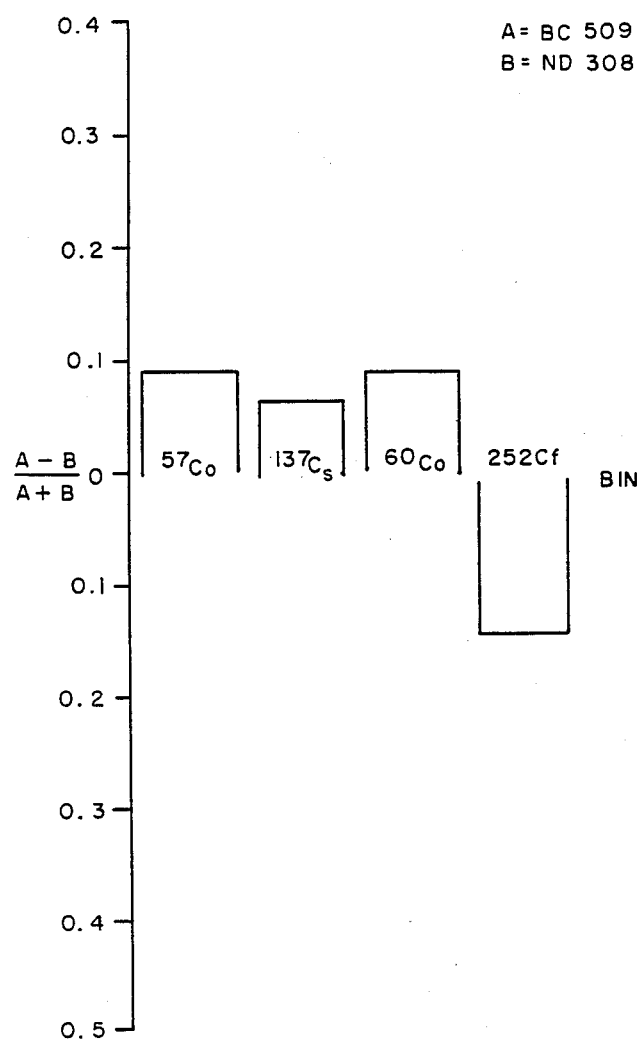
FIG. 4 shows differential measurements between two scintillators other than shown in FIG. 3 for the same four radiation inputs.

Refer now to FIGS. 2 through 4 for an explanation of the scintillator materials used and typical results of comparisons between a plurality of channel pairs wherein each channel pair has a different commercial scintillator material specifically designed for comparison of their outputs when simultaneously exposed to a nuclear source. FIG. 2 shows the individual responses of six different scintillator materials to radiation sources emitting gamma rays. FIGS. 3 and 4 shows the results of differential comparisons of channel pairs having the scintillator fiber sensor materials designated in the legends on each figure.

The use of different channel pairs of different scintillator materials to designate the type rays and their energy levels into separate bins are as follows. Four separate gamma bins will be isolated by comparing the normalized difference between the outputs of the two fibers. The factor used for comparison is $(A-B)/(A+B)$, where A and B are the sensitivities of the two scintillators as designated.

The x-rays and very low energy gamma rays (0–0.1 MeV) is considered as bin 1. The pairing of A as a ND-308 boron loaded scintillator, and B as a BC-513 high hydrogen content scintillator provides a differential maximum at the low end of the energy spectrum. Therefore, these two materials can provide the identification of very low energy gamma rays.

FIG. 3 is used to show bin 2, which is comprised of low energy gamma rays (0.1–0.5 MeV). The presence of a high-Z material, such as tin, in a scintillator material enhances its ability to detect low energy gamma rays. The pairing of A and B as a ND-312 20% tin loaded scintillator A and B as a ND-312 unloaded scintillator provides a peak with a $^{57}CO$ source at 122 KeV. This bin 2 can therefore be separated from the very low energy gamma rays, as well as those higher in energy.

FIG. 4 is used to show bins 3 and 4, in which bin 3 is comprised of the mid energy gamma rays (0.5–1.0 MeV) and bin 4 is comprised of the high energy gamma rays (1.0 MeV). As described, scintillator channel pairs can distinguish bins 1 and 2 from each other, and from higher energy gamma rays. Two pairs were found to identify bin 3, in each case the ND-308 boron loaded scintillator was the A and B scintillator channel. The best results were obtained with A and B as a BC-509 hydrogen free liquid scintillator. In these measurements, the high energy response was identical for both scintillators. Thus bin 3 can be distinguished from bin 4. There are several different scintillator materials which can be used to discriminate gamma rays from fast neutrons. There is no single scintillator that is sensitive to gamma rays and not to neutrons, and vice versa. Thus, more than one scintillator must be used.

Studies of different materials for discrimination between the gamma rays and neutrons were made with the following results. The use of glass scintillator fibers is the most likely candidate for gamma and neutron discrimination. Scintillators loaded with $^6$lithium are highly neutron sensitive since neutrons striking the scintillator material produced an alpha particle, which reaction is highly energetically favorable. By instead loading a glass scintillator with $^7$lithium, the neutron sensitivity is remarkably reduced wherein the neutron cross sections differ by a factor of 1000. The gamma ray responses between the two lithium loaded glass scintillators are identical. Therefore, the differential signal between the two scintillators is directly proportional to the neutron flux. The gamma signal can be determined using these lithium loaded scintillators. Liquid scintillator pairs can also be used to separate gamma ray signals from neutron signals. Using BC-509 hydrogen free scintillator material and BC 513 hydrogen enhanced scintillator material in tandem provides a differential signal proportional to neutron flux.

We claim:

1. A multichannel coincidence nuclear detector system for detection and characterization of nuclear radiation sources moving within a remote monitored area, said system comprising:

nuclear radiation sensing means comprised of a plurality of scintillator fiber sensors, in wherein each of said plurality of scintillator fiber sensors is a line detector several meters in length comprised of an inner core material sensitive to particle nuclear radioisotopic source and a nuclear radiation transmitting outer material having a smaller index of refraction than said inner core material in which said plurality of line detector fiber sensors are positioned to measure incident nuclear radiation over a large area where the distance between the nuclear source material transported by a vehicle and said plurality of line detector fiber sensors is minimized to provide better coincidence detection of said nuclear source by all of said plurality of line detector fiber sensors simultaneously, each of said scintillator fiber sensors is fabricated from different inner core materials to have a different spectral sensitivity with regard to gamma and neutron sources and to carry out particle and energy discrimination to determine whether an incident particle flux from a nuclear source material on said line detector fiber sensors is comprised of gamma rays or fast neutrons and the relative energy of any gamma rays;

a plurality of transmitting optical fibers, each of said plurality of line detector fiber sensors connected to one of said plurality of transmitting optical fibers to form a plurality of radiation channels for transmission of optical radiation generated in each of said line detector fiber sensors by said nuclear source material moving in the proximity of said line detector fiber sensors;

an electronics system comprised of an optical detector and amplifier means for detecting optical radiation at the input thereto from said transmitting optical fibers and converting optical radiation in each of said plurality of radiation channels to electrical pulses wherein said pulses are passed through a signal thresholding device which has a triggering threshold and a high threshold into a counter for counting said threshold pulses, a microprocessor and on-board computer based signal processing means which simultaneously analyzes said plurality of radiation channels for gamma rays of different energies and for fast neutrons to provide spectral identification of the radiation incident on said plurality of line detector fiber sensors by isolating four separate gamma bins by comparing the normalized difference between the outputs of a radiation channel with one each of said plurality of radiation channels known as a plurality of radiation channel pairs wherein the inner core materials of each of said channel pairs are selectively chosen to classify the level and type of radiation incident on each of said channel pairs, and a radio frequency link connected to said microprocessor as a multichannel detector transmitter station for transmission of information of the analyzed channel pairs; and a receiver user station which selectively interrogates said multichannel detector transmitter station for information of said analyzed channel pairs wherein said transmitter station and said receiver user station have separate units comprised of a radio transceiver and a modem along with built-in batteries and interface circuitry by radio telemetry means for transmitting and receiving computer data by radio link.

2. A system as set forth on claim 1 wherein said optical detector and amplifier means in said electronics system is a microchannel plate type photomultiplier which has its cathode sectioned into quadrants for multiple radiation channel inputs and outputs.

3. A system as set forth in claim 1 wherein said inner core materials in said channel pairs are an ND-308 boron loaded scintillator and a BC-513 high hydrogen content scintillator which provide a differential maximum at the low end of the energy spectrum and classifies the radiation as x-rays or very low energy gamma rays in the 0–0.1 MeV range identified as gamma bin 1.

4. A system as set forth in claim 1 wherein said inner core materials in channel pairs are an ND-312 20% high-Z tin loaded scintillator and an unloaded ND-312 provides a peak normalized output between said channel pairs with a $^{57}CO$ source at 122KeV and classifies the radiation as low energy gamma rays in the 0.1–0.5 MeV range identified as gamma bin 2 and is separated from the very low energy gamma rays in bin 1 and the high energy gamma rays in the 1 MeV range identified as gamma bin 4.

5. A system as set forth in claim 1 wherein said inner core materials in channel pairs are an ND-308 boron loaded scintillator and a BC-509 hydrogen free liquid scintillator and classify the radiation as middle energy gamma rays in the 0.5–1 MeV range identified as gamma bin 3.

* * * * *